United States Patent
Ahluwalia et al.

(10) Patent No.: US 7,529,745 B2
(45) Date of Patent: May 5, 2009

(54) METHOD OF VERIFYING METADATA OF A MIGRATED FILE

(75) Inventors: Vikas Ahluwalia, Kirkland, WA (US); Vipul Paul, Hillsboro, OR (US); Scott A. Piper, Bothell, WA (US); Akulavenkatavara Prasadarao, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 10/993,980

(22) Filed: Nov. 19, 2004

(65) Prior Publication Data
US 2006/0112096 A1    May 25, 2006

(51) Int. Cl.
 G06F 7/00       (2006.01)
 G06F 17/30      (2006.01)
(52) U.S. Cl. ..................... 707/6; 707/203; 707/204
(58) Field of Classification Search .......... 707/203, 707/6
See application file for complete search history.

(56) References Cited

U.S. PATENT DOCUMENTS

| | | | |
|---|---|---|---|
| 6,304,882 B1 | 10/2001 | Strellis et al. | 707/202 |
| 2002/0188667 A1 | 12/2002 | Kirnos | 709/203 |
| 2004/0123202 A1 | 6/2004 | Talagala et al. | 714/736 |
| 2004/0163029 A1 | 8/2004 | Foley et al. | |
| 2005/0198352 A1* | 9/2005 | Fleck et al. | 709/232 |

* cited by examiner

Primary Examiner—Wilson Lee
Assistant Examiner—Belinda Xue
(74) Attorney, Agent, or Firm—Lieberman & Brandsdorfer, LLC

(57) ABSTRACT

A method and system for maintaining integrity of metadata associated with a migrated file. Following migration of data from a source filesystem to a destination filesystem, a tool is automatically invoked to detect if there are any differences in metadata associated with the files and/or folders at each location. Each select field of the metadata at the source filesystem is reviewed to ensure that it matches with the equivalent field at the destination filesystem. In the event at least one of the reviewed metadata fields does not match, an error is generated and forwarded to an operator.

5 Claims, 12 Drawing Sheets

METHOD OF VERIFYING METADATA OF A MIGRATED FILE

BACKGROUND OF THE INVENTION

1. Technical Field

This invention relates to a method and system for verifying migration of data. More specifically, as files are migrated to a different storage system metadata associated with the transferred file is verified.

2. Description of the Prior Art

In a multiprocessing computer system, a storage area network ("SAN") is an increasingly popular storage technology. The SAN allows multiple computers to access a set of storage devices, also known as storage media. Often data may be migrated between filesystems hosted on different storage media through a computer network. The computer network may be a local area network, a wide area network, a telecommunication network, a computer component network, a message based network, or other functionally equivalent data transfer network system. Migration of data is common during a backup or restore operation. A source filesystem is the original filesystem storing the associated data, and a destination filesystem is the filesystem storing the transferred data. Each file and folder in the source filesystem is comprised of data and metadata. The data includes numerical or other information represented in a form suitable for processing. The metadata includes information pertaining to the size, creation time, last modification time, and security attributes of the file and/or folder. When a file and/or folder is transferred from the source filesystem to the destination filesystem, both the data and metadata are required to accompany the transfer.

At such time as a transfer of a file and/or folder between filesystems, an operator may specify that all or a portion of the associated metadata accompany the transferred file. If the source and destination filesystems are different, there is an increased likelihood that there may have been an incomplete transfer of the associated metadata. Although there are tools that synchronize two file sets, the prior art does not provide a tool that detects differences in metadata of the two file sets to verify that the metadata was correctly preserved during the transfer from the source filesystem to the destination filesystem. In addition, current data transfer tools do not ensure preservation of transferred metadata of the creation time and last modification time, nor do they allow the user to verify correct preservation of the metadata during the data transfer. Prior art solutions for checking preservation of transferred metadata require a manual check of corresponding files and folders in both the source and destination filesystems. However, the prior art does not provide a tool that supports an automated verification of metadata of all files and folders at both the source and destination filesystem locations.

Accordingly, there is a need for an automated tool that validates the integrity of metadata at both the source and destination filesystem locations of all transferred files and folders.

SUMMARY OF THE INVENTION

This invention comprises a method and system for maintaining the integrity of file metadata during a migration of the file between filesystems.

In one aspect of the invention, a method is provided for verifying preservation of metadata. Metadata of a file from a source filesystem location is compared with metadata of the file at a destination filesystem location. Thereafter, a test is conducted to determine if the metadata of the file from the source filesystem is equivalent to the metadata of the file at the destination filesystem.

In another aspect of the invention, a computer system is provided with two filesystems. A file having data and metadata is provided from a source filesystem location, and a file having data and metadata is provided at a destination filesystem location. A director is employed to compare the source filesystem metadata with the destination filesystem metadata, and to determine if the metadata of the file from the source filesystem is equivalent to the metadata of the file at the destination filesystem.

In yet another aspect of the invention, an article is provided with a computer readable storage medium. Means in the medium are provided for storing metadata of a file from a source filesystem location, and for storing metadata of a file at a destination filesystem location. In addition, means in the medium are provided for comparing metadata of the file from the source filesystem location with metadata of the file at the destination filesystem location, and for determining if the metadata of the file from the source filesystem is equivalent to the metadata of the file at the destination filesystem.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

During the course of transferring a file from a source filesystem to a destination filesystem, both data and metadata are transferred. In order to determine if the transfer of data was complete, a review and comparison of the metadata of the destination file and/or folder with the metadata of the source file and/or folder is conducted. Metadata associated with each file and folder in both the source and destination file systems is compared. If any of the metadata elements associated with each file and/or folder in the source or destination filesystem does not match, the comparison fails.

Technical Details

Figure 1A:
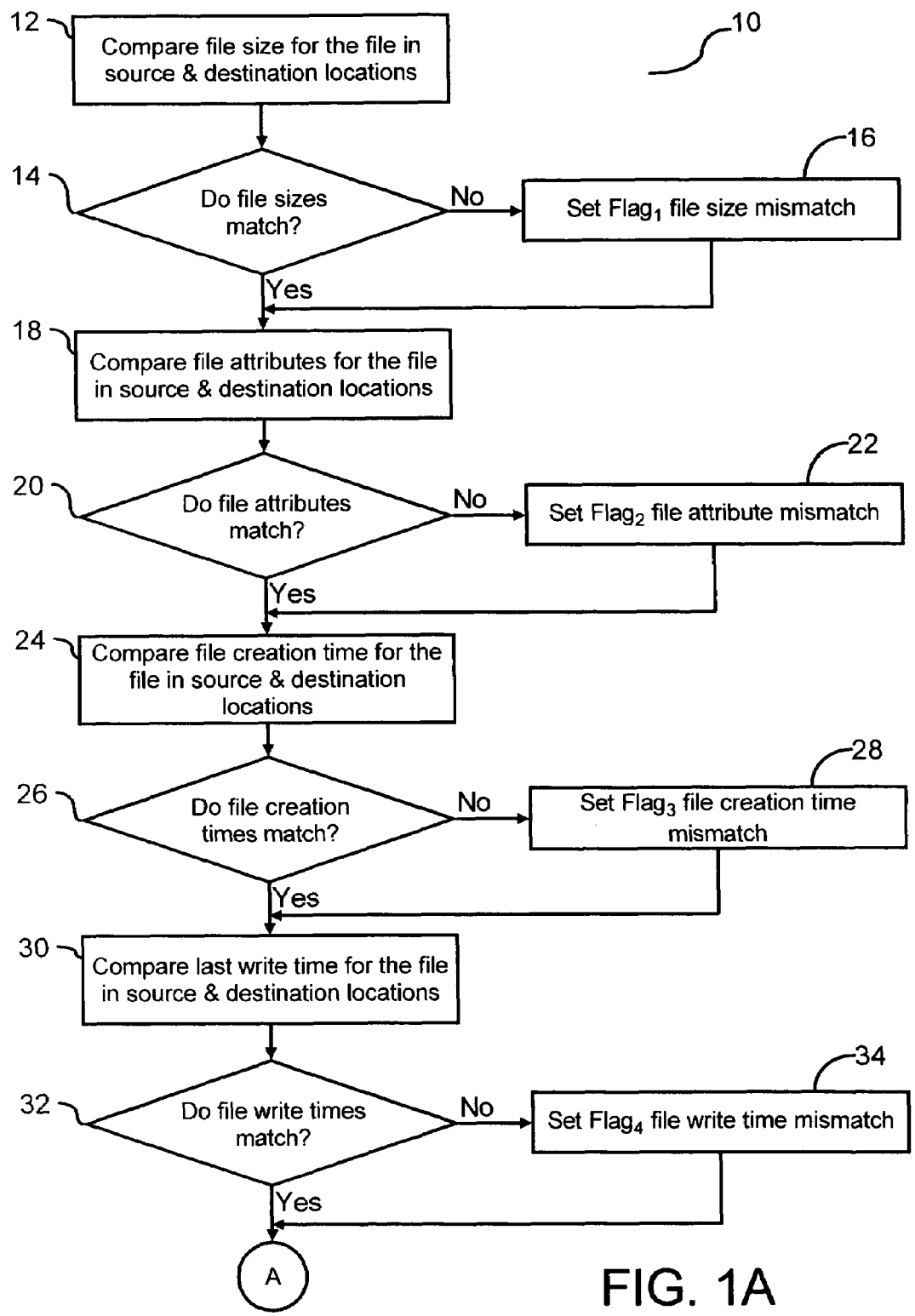
FIGS. 1a-1c are a flow chart illustrating a process for verifying migrated data.
Figure 1B:
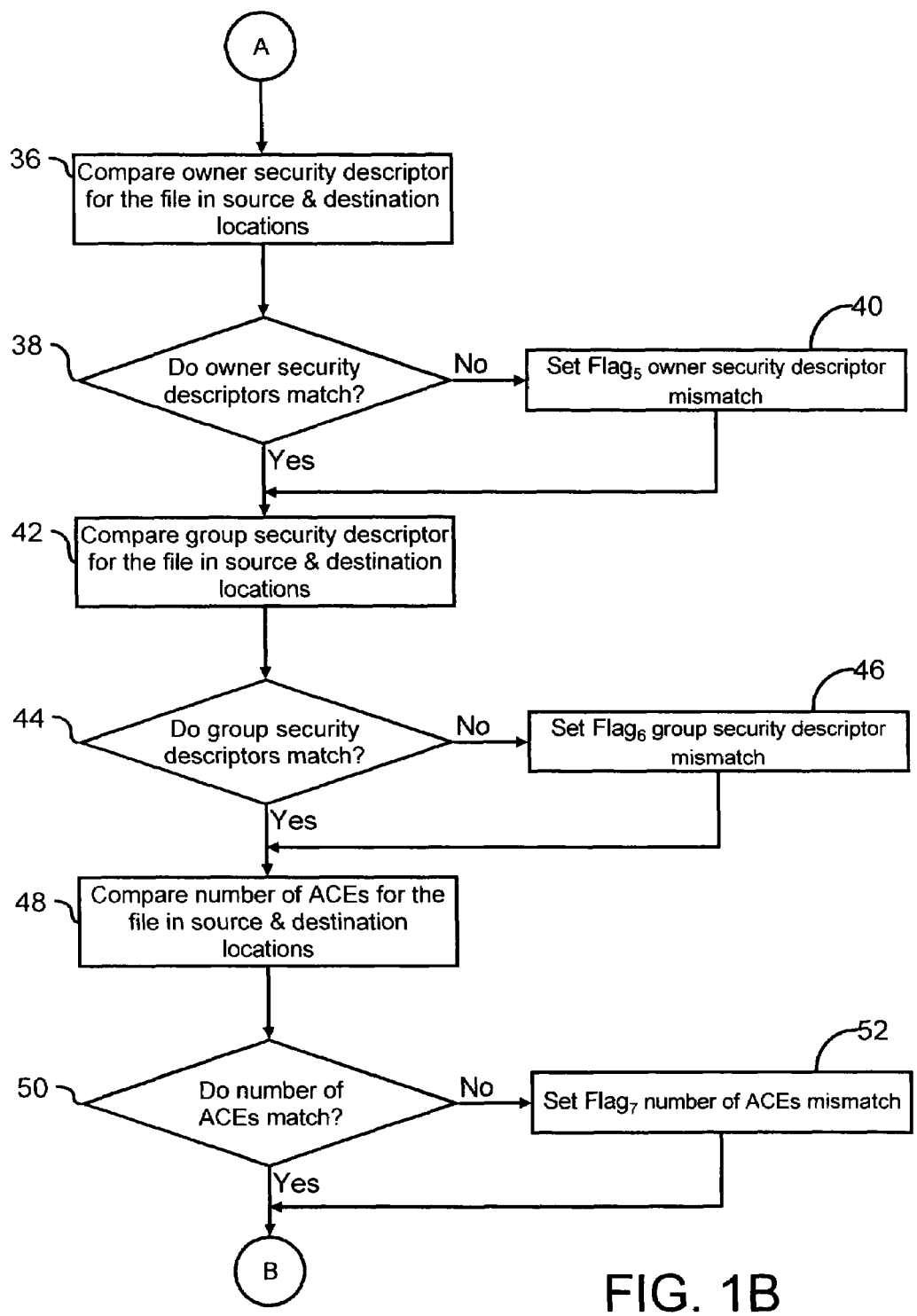
Figure 1C:
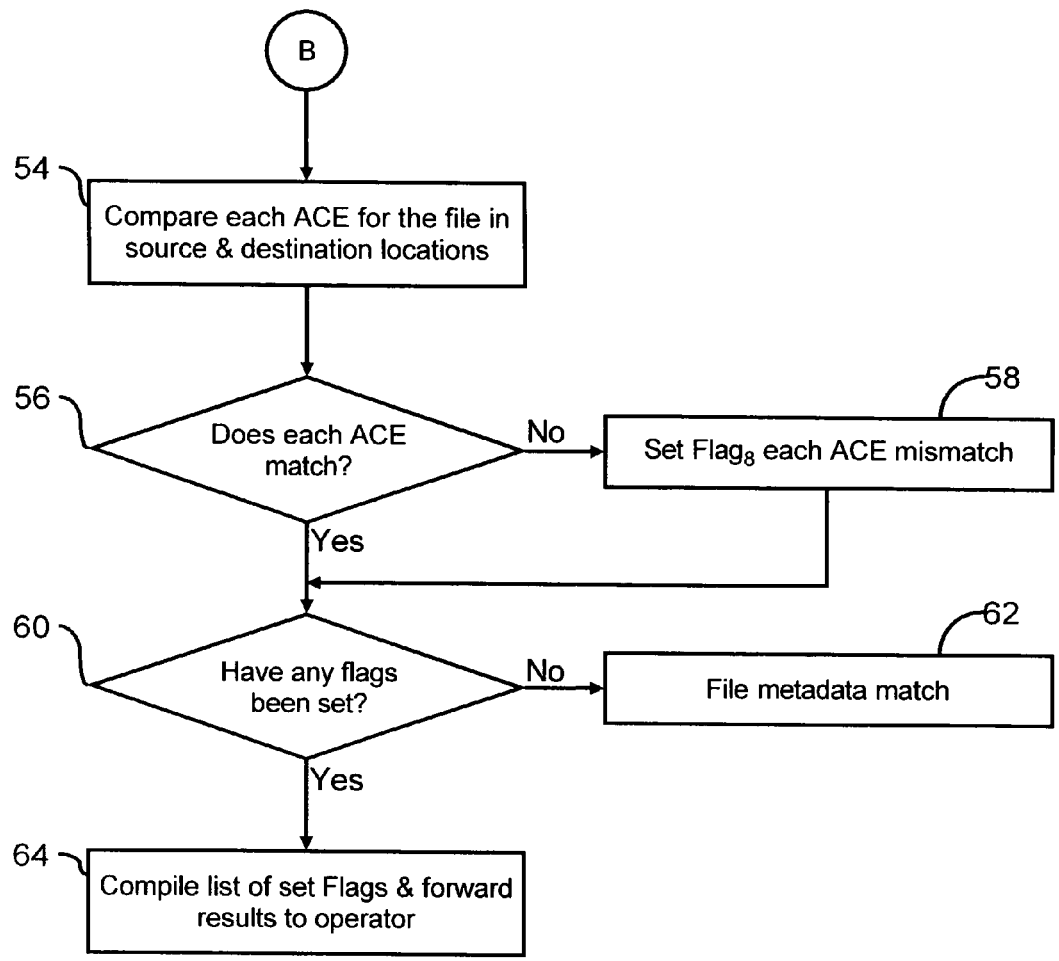

FIGS. 1a, 1b, and 1c are a flow chart (10) illustrating a process for verifying migration of metadata. The following set of steps is conducted for each file and folder that has been migrated. If any of the comparisons fail, this is an indication that the security information related to the data may have been compromised. The file size of the source file is compared to the file size of the destination file (12). A test is then conducted to determine if the source and destination file sizes match (14). If the response to the test at step (14) is negative, a flag is set to indicate that the file sizes do not match (16). Following a positive response to the test at step (14) or setting of the flag at step (16), a comparison is conducted of the file attributes of the source file with the file attributes of the destination file (18). Thereafter, a test is conducted to determine if the file attributes compared at step (18) match (20). If the response to the test at step (20) is negative, a flag is set to indicate that the attributes of the source and destination files do not match (22). A positive response to the test at step (20) or following setting of the flag at step (22) will result in a subsequent test to compare the file creation time for the source file with the file creation time for the destination file (24). Following the comparison at step (24), a test is conducted to determine if the file creation times compared at step (24) match (26). If the response to the test at step (26) is negative, a flag is set to indicate that the file creation times of the source and destination files do not match (28). Similarly, following a positive response to the test at step (26) or setting of the flag at step (28), a comparison is conducted of the last write time of the file at both the source and destination locations (30). Thereafter, a test is conducted to determine if the write times compared at step (30) match (32). A negative response to the test at step (32) will result in setting a flag (34), and a positive response to the test at step (32) will result in a comparison of the owner security descriptor for the source file with the owner security descriptor for the destination file (36). The security descriptor is a description of the security associated with the file and is commonly used in file storage to indicate ownership rights of the file and permission rights for access to the file. More specifically, the security descriptor identifies the file objects owner and primary group, and may also contain an access control list (DACL) that is controlled by the owner of an object and that specifies access particular users or groups can have to the object. Following the comparison at step (36), a test is conducted to determine if the owner security descriptors compared at step (36) match (38). A negative response to the test at step (38) will result in setting a flag to indicate that the owner security descriptors of the source and destination files do not match (40). Alternatively, a positive response to the test at step (38) or setting of the flag at step (40) will result in a subsequent comparison of group security descriptors for the file at both the source and destination filesystems (42). The comparison at step (42) is followed by a test to determine if the group security descriptors match (44). A negative response to the test at step (44) will result in setting a flag indicating the mismatch (46). Following the setting of the flag at step (46) or a positive response to the test at step (44), a comparison is conducted of the number of access control entries (ACEs) of the source file with the ACEs of the destination file (48). Each ACE specifies a set of access rights and contains a security identifier (SID) that identifies a trustee for whom the rights are allowed, denied, or audited. A trustee can be a user account, a group account, or a logon session. Thereafter, a test is conducted to determine if the quantity of ACEs of the file at the source and destination filesystems match (50). If the quantity of ACEs compared at step (50) does not match, a flag is set to indicate the mismatch (52). However, if the quantity of ACEs compared at step (50) match or following setting of the flag at step (52), a comparison of each ACE at both the source and destination files is conducted (54). Thereafter, a test is conducted to determine if each ACE compared at step (54) matches (56). A negative response to the test at step (56) will result in setting a flag for each ACE that did not match (58). Following setting of the flag (s) at step (58) or a positive response to the test at step (54), a final test of the verification is conducted to determine if any flags have been set in the verification process (60). A positive response to the test at step (60) will in compilation of a list of all flags set during the comparison processes and forwarding of the compiled list to an operator (64). Alternatively, if the response to the test at step (60) is negative, this is an indication that the metadata of the source and destination filesystems match (62). Accordingly, the above outlined process is conducted for each file and folder that is migrated from a source filesystem to a destination filesystem to ensure that the migration was successful.

Figure 2:
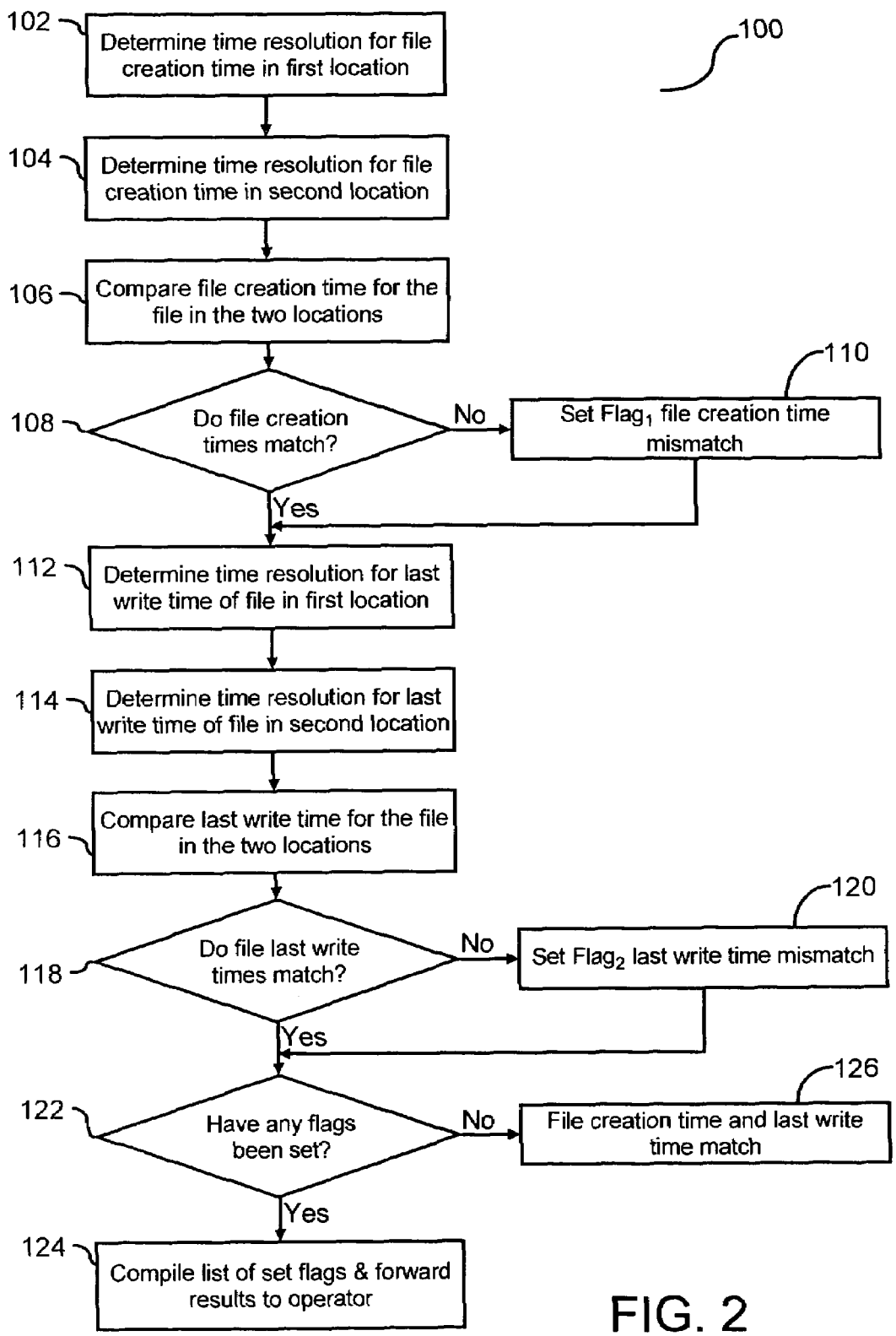
FIG. 2 is a flow chart illustrating a process for comparing time for a file at two filesystem locations.

As shown in FIGS. 1a, 1b, and 1c, one part of the metadata verification process is to determine creation time of the file at both the source and destination locations. FIG. 2 is a flow chart (100) illustrating the process for comparing time attributes associated with copies of the file at both the source and destination locations. To compare the creation time for the files, the time resolution for the creation of the file at the source location is determined (102). Time resolution is the granularity of the time variable associated with creation of the file. Following the determination at step (102), the time resolution for the creation of the file at the destination location is determined (104). The details of the logic associated with steps (102) and (104) are shown in FIG. 3. Upon completion of the determinations at steps (102) and (104) the file creation time of the file for the source location is compared to the file creation time of the file for the destination location (106). The details of the comparison conducted at step (106) are shown in FIGS. 4a and 4b. Following the comparison at step (106), a test is conducted to determine if the file creation time for the file at the source and destination locations compared at step (106) match (108). If the comparison at step (108) fails, a flag is set to indicate the failure (110). Following setting of the flag at step (110) or if the test at step (108) does not fail, a subsequent determination is conducted for the time resolution for the last write time of the file at the source location (112), followed by a determination for the time resolution for the last write time of the file at the destination location (114). The details of the logic associated with steps (112) and (114) are shown in FIG. 5. Following the determination at steps (112) and (114), a comparison is conducted of the last write time of the file for the source location with the last write time of the file for the destination location (116). The details of the logic associated with the comparison at step (116) is shown in FIGS. 6a and 6b. Following the comparison at step (116), a test is conducted to determine if the last write time of the file at the source location matches with the last write time of the file at the destination location (118). A negative response to the test at step (118) will result in setting a flag to indicate the false return of the comparison (120), i.e. a last write time mismatch. Following step (120) or a positive response to the test at step (118), an inquiry (122) is conducted to determine if a flag has been set in relation to the file creation time comparison at step (110) or in relation to the last write time comparison at step (120). If the response to the inquiry at step (122) is positive, the flags set at steps (110) and (120) are compiled and forwarded to an operator. Alternatively, a negative response to the test at step (122) is an indication that the file creation time and last write time match. Accordingly, the comparison of the creation time of the source and destination files requires determinations and comparisons associated with the resolution of the file creation time for each of the locations.

Figure 3A:
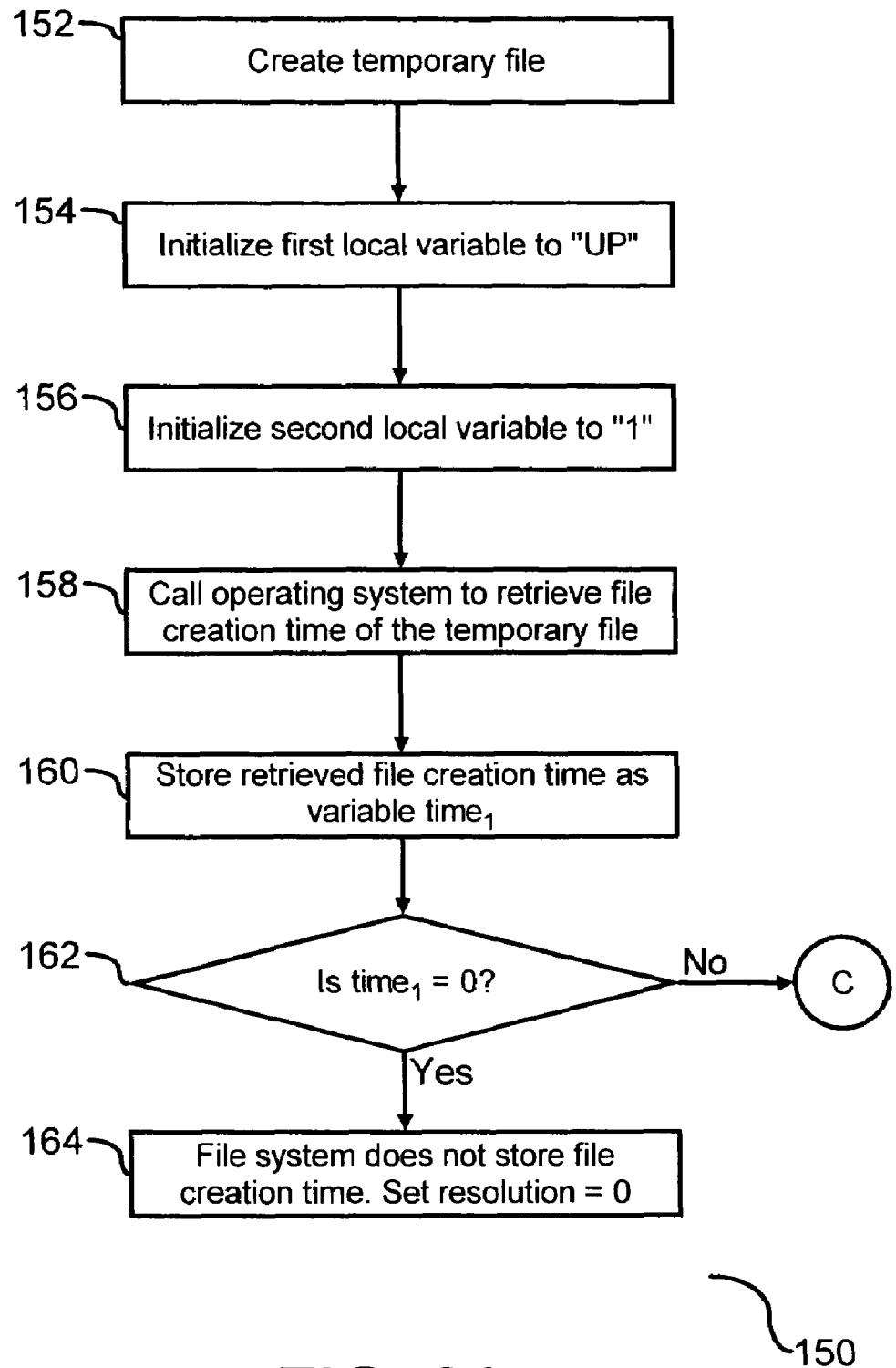
FIGS. 3a and 3b are a flow chart illustrating a process for determining time resolution for creation time in a filesystem.
Figure 3B:
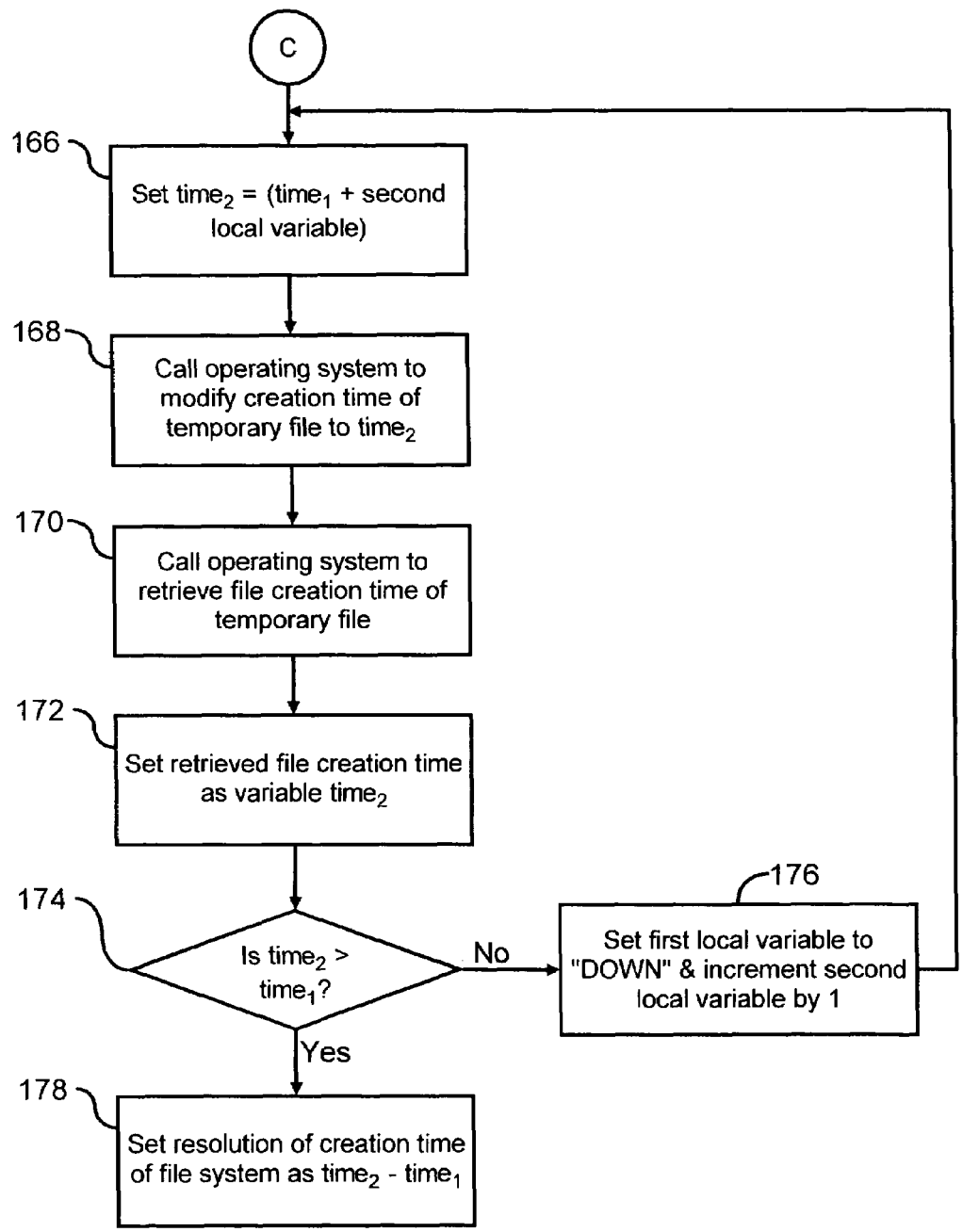
Figure 4A:
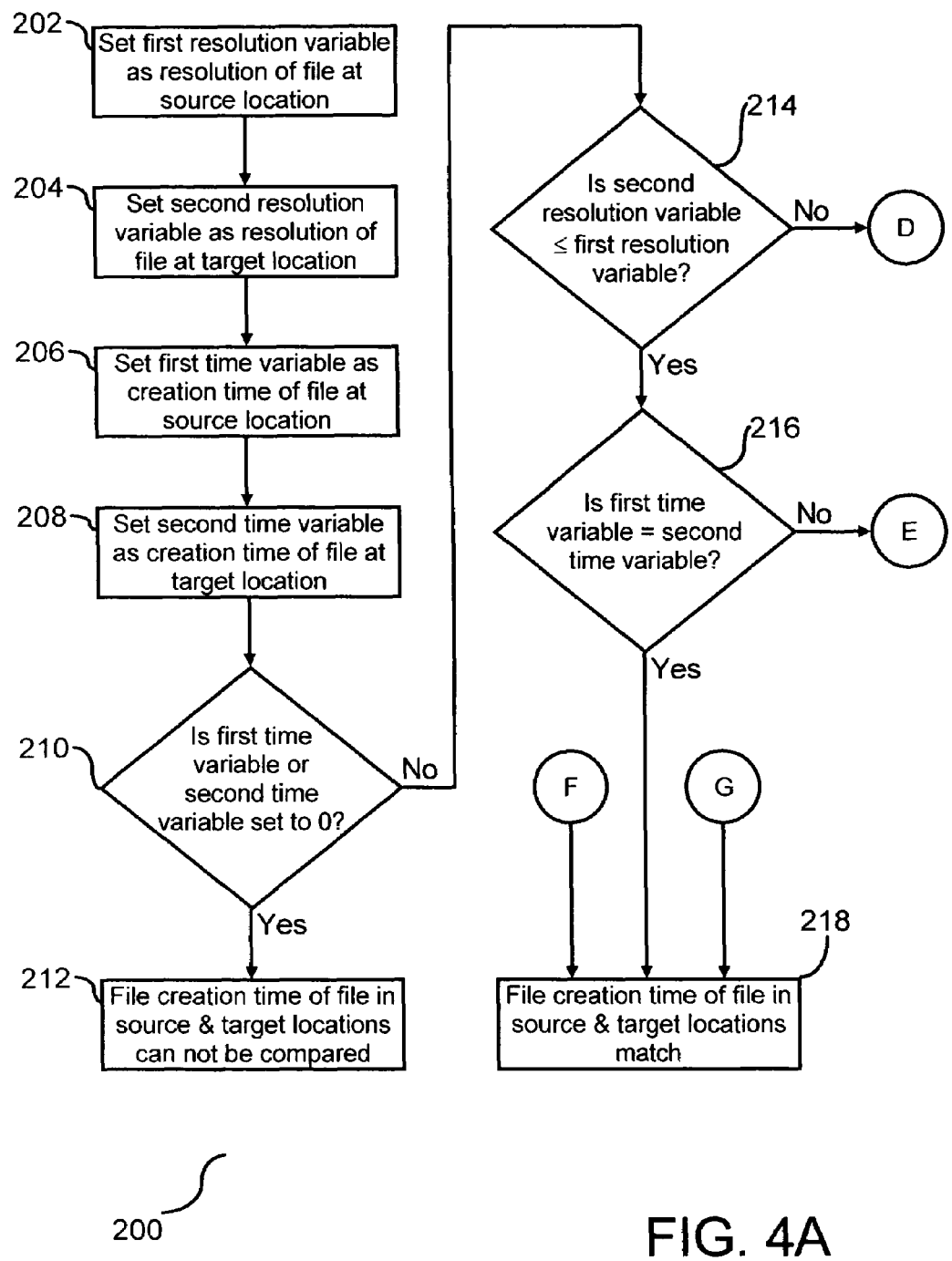
FIGS. 4a and 4b are a flow chart illustrating a process for comparing file creation time of a file at two filesystem locations.
Figure 4B:
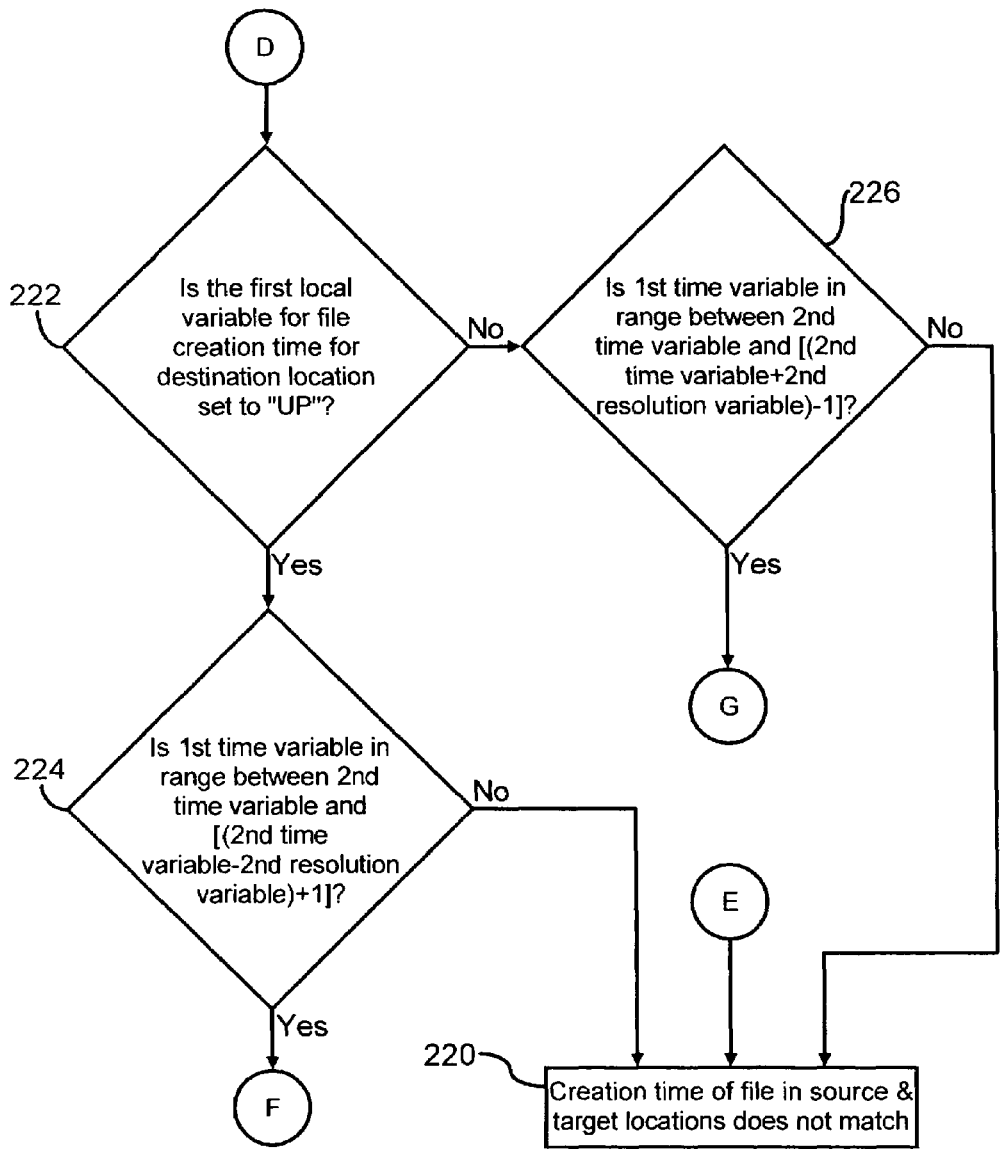

FIGS. 3a and 3b are a flow chart (150) illustrating the process for determining the time resolution for creation time in a filesystem. A temporary file is created on the filesystem whose resolution is being determined (152). A first local variable is initialized to "UP" (154), and a second local variable is initialized to "1" (156). The Microsoft® Windows® application programming interface (API) is used to call the operating system to find information on the temporary file created at step (152) and to retrieve the associated file creation time of the temporary file (158). The data returned at step (158) is stored as variable $time_1$ (160). Thereafter, a test is conducted to determine if the value of the variable $time_1$ is zero (162). A positive response to the test at step (162) is an indication that the filesystem does not store the file creation time, and the resolution of the file creation time for the filesystem is set to zero (164). However, a negative response to the test at step (162) results in setting a new time variable, $time_2$, and setting this variable to the sum of $time_1$ and the second local variable (166). Thereafter, a call to the operating system is conducted to modify the creation time of the temporary file to $time_2$ (168), followed be another call to the operating system to retrieve the file creation time of the temporary file (170). The retrieved file creation time is stored as variable $time_2$ (172). A test is then conducted to determine if the value of $time_2$ is greater than the value of $time_1$ (174). If the response to the test at step (174) is negative, the first local variable is set to "DOWN" and the second local variable is incremented by a value of one (176), followed by a return to step (166). However, a positive response to the test at step (174) will result in setting the resolution of the filesystem as the difference between $time_2$ and $time_1$ (178). The value returned at step (178) is returned to the logic at steps (102) and (104) of FIG. 2 to compare the time resolution of the file at a specified filesystem.

FIGS. 4a and 4b are a flow chart (200) illustrating the details of the process for comparing the file creation time of a specified file at the source and destination locations. A first resolution variable is set as the resolution of the file when the file was created at the source location (202), and a second resolution variable is set as the resolution of the file when the file was created at the destination location (204). In addition, a first time variable is set as the creation time of the file at the source location (206), and a second time variable is set as the creation time of the file at the destination location (208). Thereafter, a test is conducted to determine if the first time variable or the second time variable is set to zero (210). A positive response to the test at step (210) is an indication that the file creation time of the file at the source and destination locations cannot be compared (212). However, a negative response to the test at step (210) is an indication that the file creation time of the two locations can be compared. A subsequent test is conducted to determine if the second resolution variable is less than or equal to the first resolution variable (214). A positive response to the test at step (214) will result in a subsequent test to determine if the first time variable is equal to the second time variable (216). A positive response to the test at step (216) is an indication that the file creation time of the designated files at the source and destination locations match (218). However, a negative response to the test at step (216) is an indication that the file creation time of the designated files at the source and destination locations do not match (220).

Similarly, a negative response to the test at step (214) will result in a subsequent test to determine if the first local variable used in determining the resolution of the creation of the file in the destination location set in FIGS. 3a and 3b is set to "UP" (222). A positive response to the test at step (222) is an indication that the time resolution of designated files at both the source and destination locations match. Thereafter, a subsequent test is conducted to determine if the first time variable set at step (206) falls within the following range (224): the upper limit of the second time variable set at step (208), and the lower limit of the difference between the second time variable set at step (208) and the sum of the second resolution variable set at step (204) incremented by an integer of one. If the response to the test at step (224) is positive, this is an indication that the file creation time of the designated files at the source and destination locations match (218). However, if the response to the test at step (224) is negative, this is an indication that the file creation time of the source and destination locations do not match (220). Finally, a negative response to the test at step (222) will result in a subsequent test to determine if the first time variable set at step (206) falls within the following range (226): the upper limit of the second time variable set at step (208), and the lower limit of the difference between the second time variable set at step (208) and the second time variable decreased by an integer of one. A positive response to the test at step (226) is an indication that the file creation time of the designated files at the source and destination locations match (218), and a negative response to the test at step (226) is an indication that the file creation time of the designated files at the source and destination locations do not match (220). Accordingly, the process of determining a match of file creation times on different locations includes an evaluation of the resolution used to track time.

Figure 5A:
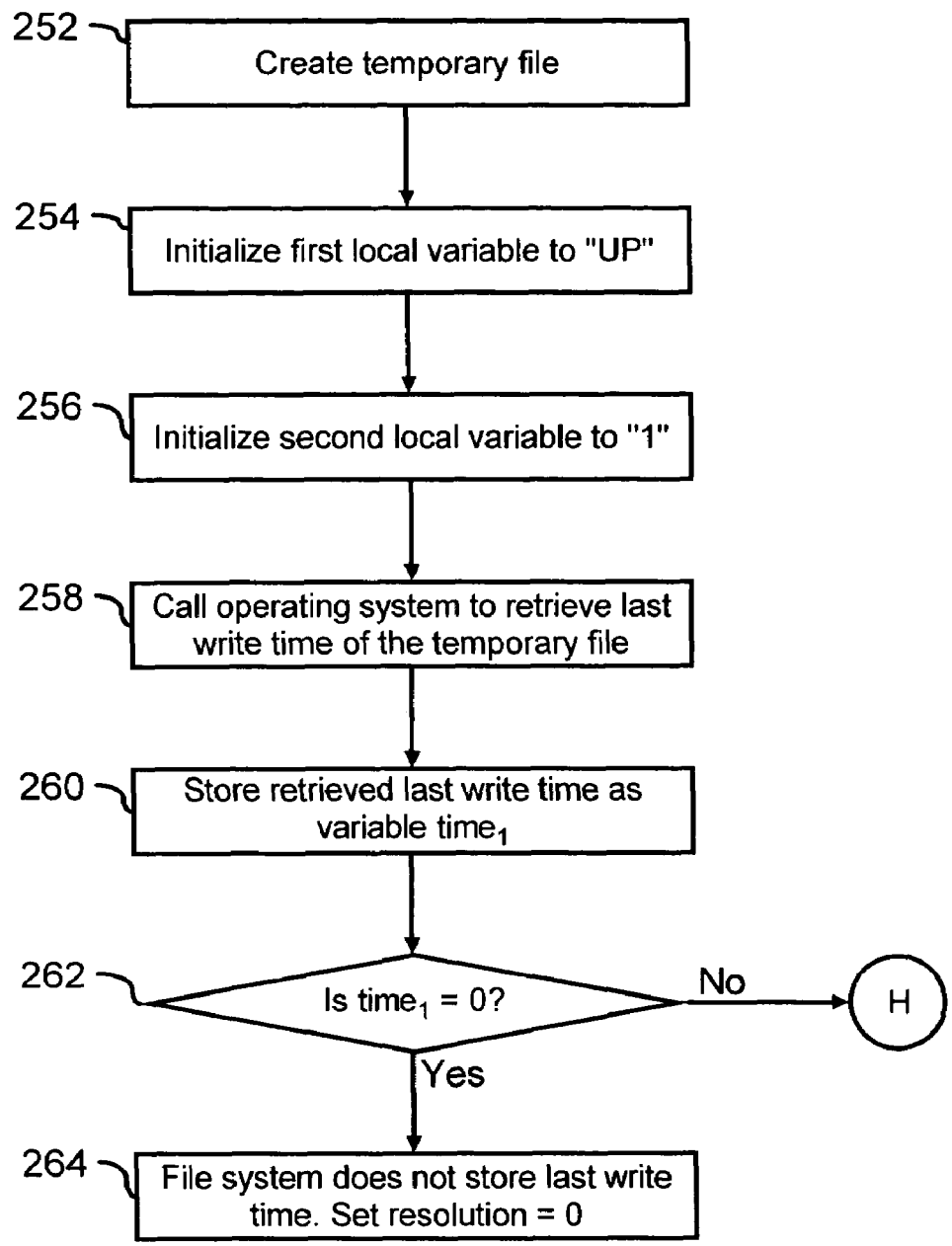
FIGS. 5a and 5b are a flow chart illustrating a process for determining time resolution for a last write time of a file in a filesystem.
Figure 5B:
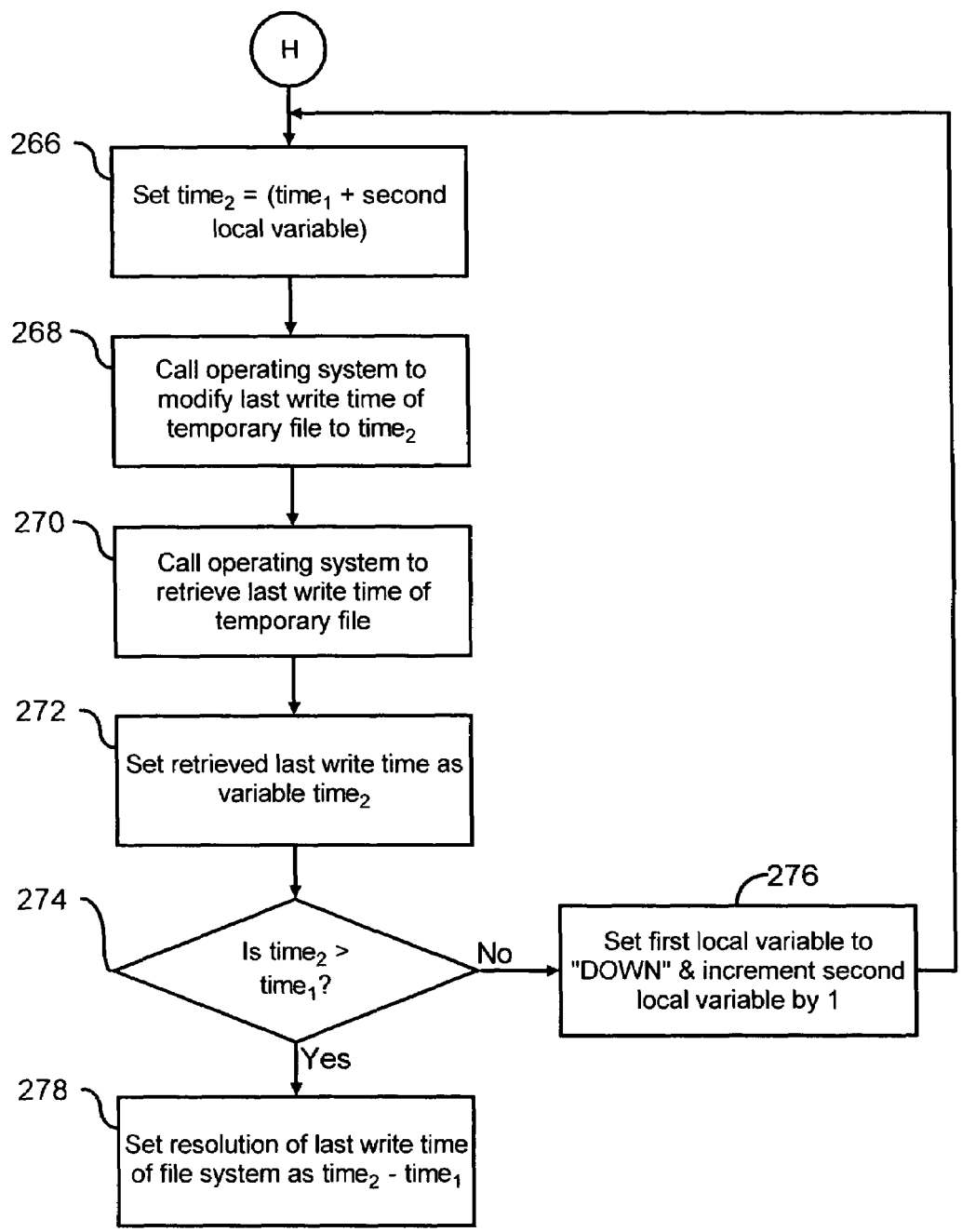
Figure 6A:
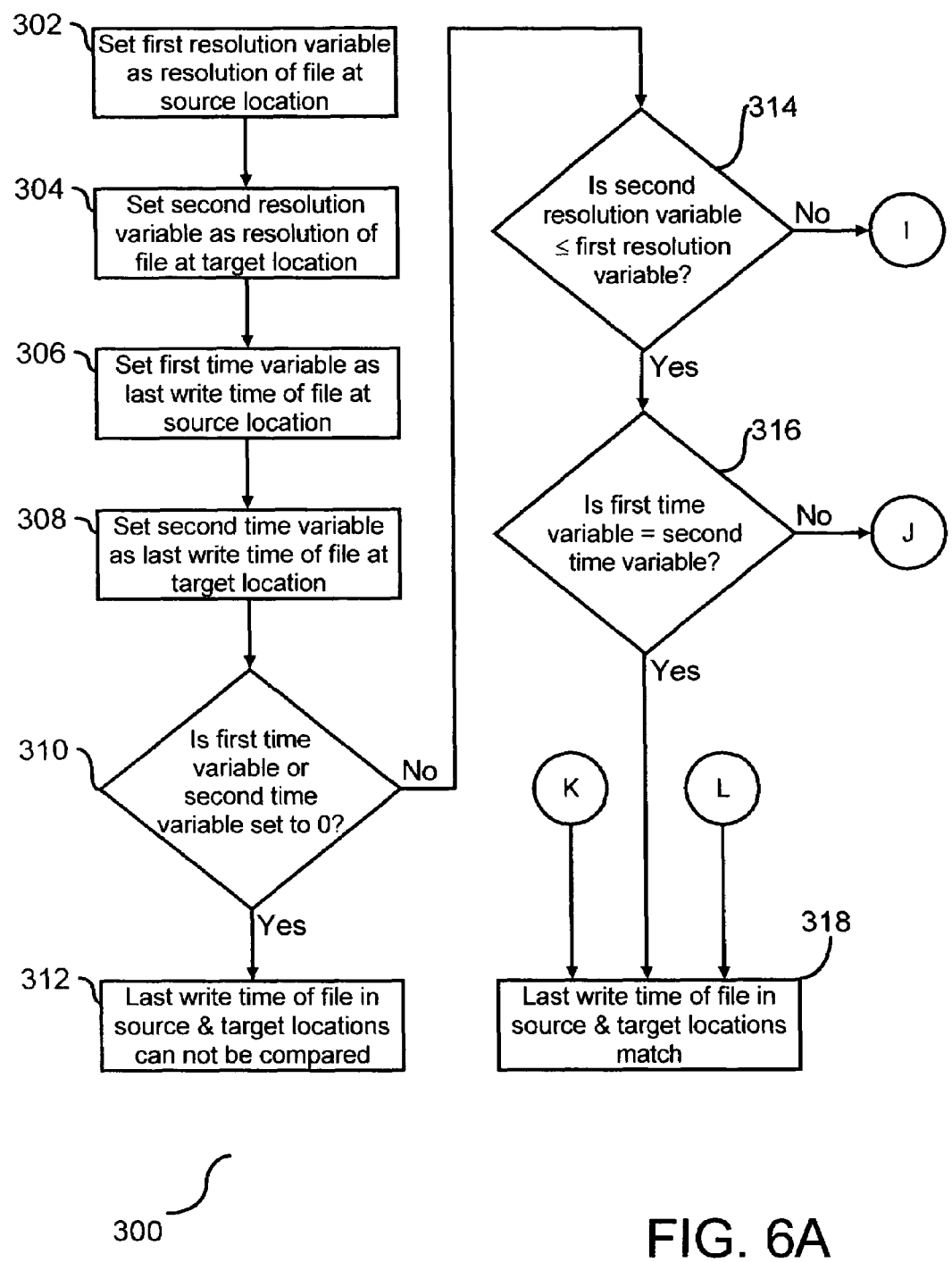
FIGS. 6a and 6b are a flow chart illustrating a process for comparing a last write time of a file at two filesystem locations.
Figure 6B:
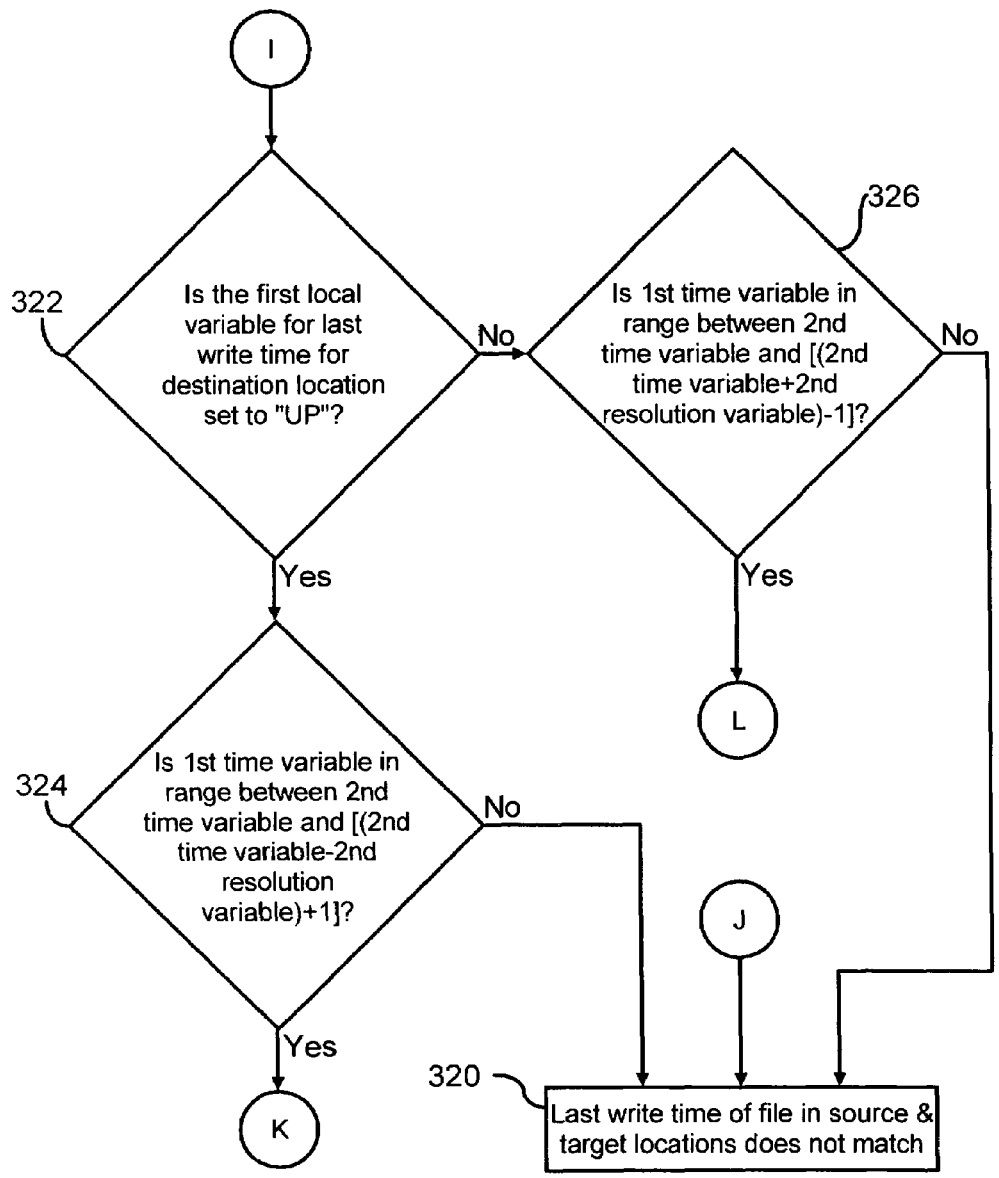

FIGS. 5a and 5b are a flow chart (250) illustrating the details of determining the time resolution for the last write time in a filesystem. The process demonstrated in this figure is similar to that shown in FIG. 3. A temporary file is created on the filesystem whose resolution is being determined (252). A first local variable is initialized to "UP" (254), and a second local variable is initialized to "1" (256). The Microsoft® Windows® application programming interface (API) is used to call the operating system to find information on the temporary file created at step (252) and to retrieve the associated last write time of the temporary file (258). The data returned at step (258), i.e. the last write time, is stored as variable $time_1$ (260). Thereafter, a test is conducted to determine if the value of the variable $time_1$ is zero (262). A positive response to the test at step (262) is an indication that the filesystem does not store the last write time of the file, and the resolution of the last write time for the filesystem is set to zero (264). However, a negative response to the test at step (262) results in setting a new variable $time_2$ and setting this variable to the sum of $time_1$ and the second local variable (266). Thereafter, a call to the operating system is conducted to modify the last write time of the temporary file created at step (252) to $time_2$ (268), followed by a subsequent call to the operating system again to obtain information about the temporary file and to retrieve its new value of last write time (270). The data returned in step (270) is stored as variable $time_2$ (272). A test is then conducted to determine if the value of $time_2$ is greater than the value of $time_1$ (274). If the response to the test at step (274) is negative, the first local variable is set to "DOWN" and the second local variable is incremented by a value of one (276), followed by a return to step (266). However, a positive response to the test at step (274) will result in setting the resolution of the last write time of the filesystem as the difference between $time_2$ and $time_1$, (278). The value returned at step (278) is returned to the logic at steps (112) and (114) of FIG. 2 to provide the resolution of the last write time of the filesystem.

FIGS. 6a and 6b are a flow chart (300) demonstrating a process for comparing the last write time of a file at two locations. A first variable is set as the resolution of the last write time of a source file at a source location (302), and a second variable is set as the resolution of the last write time of a destination file at a destination location (304). In addition, a first time variable is set as the last write time of the source file at the source location (306), and a second time variable is set as the last write time of the destination file at a destination location (308). A test is then conducted to determine if the first time variable set at step (306) or the second time variable set at step (308) has a value of zero (310). If the response to the test at step (310) is positive, this is an indication that the last write time of source and destination files cannot be compared (312). However, a negative response to the test at step (310) is an indication that the comparison of last write times can be commenced. Another test (314) is conducted to determine if the second resolution variable set at step (304) is less than or equal to the first resolution variable set at step (302). If the response to the test at step (314) is positive, a subsequent test (316) is conducted to determine if the first time variable set at step (306) is equal to the second time variable set at step (308). A negative response to the test at step (316) is an indication that the last write time of the file at the source and destination locations do not match (320). Similarly, a positive response to the test at step (316) is an indication that the last write time of the file at both the source and destination locations match (318). However, if the response to the test at step (314) is negative, a subsequent test is conducted to determine if the first local variable used in determining the resolution of the last write time of the file in destination location set in FIGS. 5a and 5b is set to "UP" (322). A positive response to the test at step (322) will result in a subsequent test to determine if the first time variable set at step (306) falls within a range defined by an upper limit of the second time variable set at step (308) and a lower limit of the second time variable set at step (308) less the second resolution variable set at step (304) incremented by an integer of one (324). A positive response to the test at step (324) is an indication that the last write time of the file at the two locations matches (320). Alternatively, a negative response to the test at step (324) is an indication that the last write time of the file at the two locations does not match (318). Finally, if the response to the test at step (322) is negative, a final test (326) is conducted to determine if the first time variable set at step (306) falls within a range defined by an upper limit of the second time variable set at step (308) and a lower limit of the sum second time variable set at step (308) and the second resolution variable set at step (304) less an integer of one. A positive response to the test at step (326) is an indication that the last write time of the file at the two locations match (320), and a negative response to the test at step (326) is an indication that the last write time of the file at the two locations do not match (318). Accordingly, the results of the last write time comparison is forwarded to the test conducted at step (116) of FIG. 2.

Advantages Over The Prior Art

The metadata verification process is automated for all filesystem transfer of files and/or folders. A correct transfer of the migrated files and/or folders is an indication that the transfer is complete and security of the files and/or folders has not been compromised in the transfer. In the event the integrity of the metadata transfer has been compromised, a compilation of flags associated with each error is forwarded to the operator to indicate a source of error associated with the data migration. Accordingly, the automated tool functions to detect differences in metadata in two copies of a file set, and in the event a difference is detected that associated error is communicated to the operator.

Alternative Embodiments

It will be appreciated that, although specific embodiments of the invention have been described herein for purposes of illustration, various modifications may be made without departing from the spirit and scope of the invention. In particular, the metadata verification tool may be modified to compare additional metadata fields, or only select metadata fields. Accordingly, the present invention is not intended to be limited to the embodiments shown herein, but is to be accorded the widest scope consistent with the principles and features disclosed herein.

We claim:

1. A method for verifying preservation of metadata comprising:
   migrating a file from a source filesystem, stored upon a storage device, to a destination filesystem, wherein said source filesystem and said destination filesystem are maintained on different storage systems;
   automatically comparing metadata said file transferred from said source filesystem location with metadata of said file at said destination filesystem location, including:
      determining time resolution of each of said filesystems and setting a time resolution flag if time resolution of each of said filesystems do not match;
      comparing creation time of said file at each of said filesystems and setting a creation time flag if creation time of each of said filesystems do not match; and
      comparing a last write time of said file at each of said filesystem and setting a last write time flag if last write time of each of said filesystems do not match;
   determining if said metadata of said file from said source filesystem is equivalent to said metadata of said file at said destination filesystem;
   compiling a list of metadata transfer failures, including mismatch flags; and
   transmitting all flags to an operator indicating a source of error responsive to a difference in said metadata in two copies of the migrated file.

2. The method of claim 1, wherein said source filesystem and said destination filesystem are different filesystems.

3. The method of claim 1, wherein said resolution includes last write time.

4. The method of claim 1, wherein said metadata is selected from a group consisting of: size, attributes, owner security descriptor, group security descriptor, quantity of access control entries, access control entries, and combinations thereof.

5. A method for verifying preservation of metadata comprising:
   migrating a file from a source filesystem, stored upon a storage device, to a destination filesystem, wherein said source filesystem and said destination filesystem are maintained on different storage systems;
   automatically comparing metadata of said file transferred from said source filesystem location with metadata of said file at said destination filesystem location, including:
      setting a first resolution variable as resolution of said file at said source file system location;
      setting a second resolution variable as resolution of said file at said destination filesystem location;
      setting a first time variable as creation time of said file at said source filesystem location; and
      setting a second time variable as creation time of said file at said destination filesystem location;

determining whether the first time variable or the second time variable is set to zero, wherein a positive response indicating that the file creation times cannot be compared, and wherein a negative response indicating that the file creation times can be compared;

determining whether the second resolution variable is less than or equal to the first resolution variable, wherein a positive response indicating the file creation time match, and wherein a negative response indicating the file creation times do not match;

determining if said metadata of said file from said source filesystem is equivalent to said metadata of said file at said destination filesystem, including evaluation of the first time variable and the second time variable; and transmitting a flag to an operator, including a metadata transfer failure, indicating a source of error responsive to a difference in said metadata in two copies of a file set of the migrating file.

\* \* \* \* \*